Aug. 25, 1959  F. J. MAZUR ET AL  2,900,872
REAR VIEW MIRROR
Filed March 3, 1954
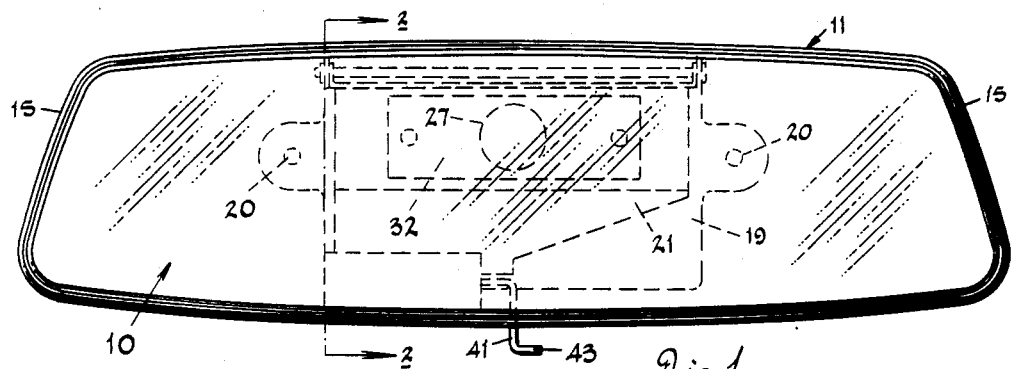
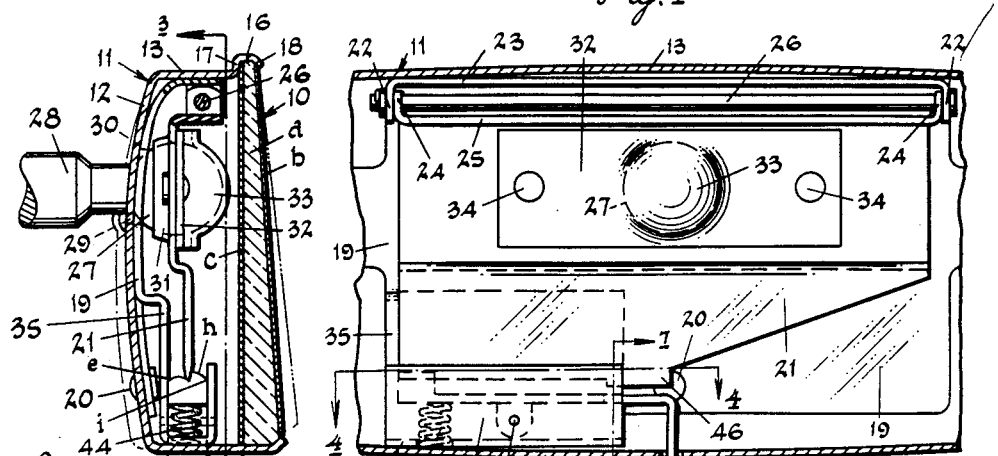
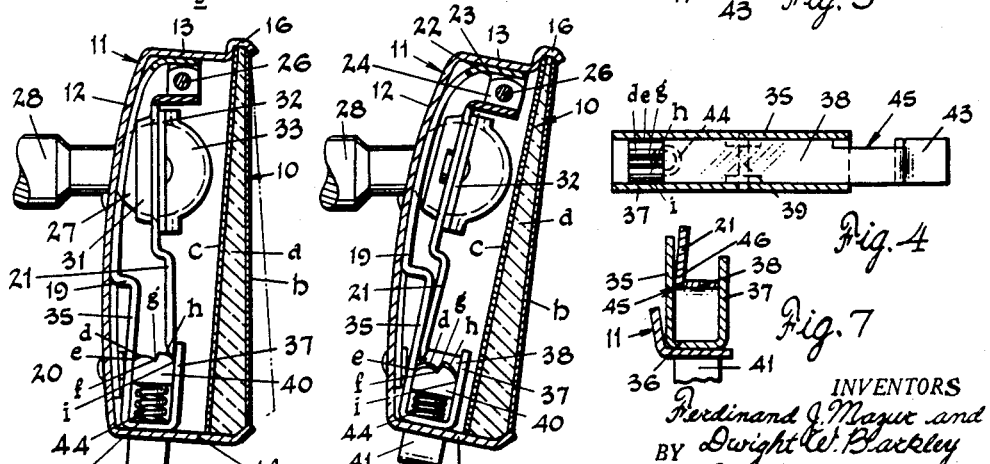
INVENTORS
Ferdinand J. Mazur and
Dwight W. Blackley
BY Nobbe & Swope
ATTORNEYS United States Patent Office 2,900,872
Patented Aug. 25, 1959

2,900,872
REAR VIEW MIRROR

Ferdinand J. Mazur, Natrona Heights, and Dwight W. Barkley, New Kensington, Pa., assignors to Libbey-Owens-Ford Glass Company, Toledo, Ohio, a corporation of Ohio Application March 3, 1954, Serial No. 413,827

5 Claims. (Cl. 88—77)

The present invention relates to improvements in rear view mirrors for automobiles and the like.

The primary purpose in the use of a rear view automobile mirror is of course to provide the driver with a satisfactory view of the rear road under the various conditions of driving. For example, in Patent No. 2,631,498, issued March 17, 1953, to Dwight W. Barkley, there is disclosed a prismatic rear view mirror which provides the automobile driver with a personal selection of three or more intensities of images of the rear road conditions. Such a mirror permits the driver to make a choice of images of various brightness, each image being of the common limited rear field of view so as to obtain maximum visibility with the minimum glare best suited to his particular personal eye glare tolerance and visual acuity under all the varying light intensities present under modern night and day driving conditions.

In the above patent, the choice of image intensity suitable to the driver is made by his selectively positioning the prismatic rear view mirror, by angular adjustment, to alternately locate the various images of differing intensities of the same limited common rear field of view in the normal line of sight of the driver as he sits in driving position in the car. Thus, the rear view mirror provides a choice of at least three image intensities which may be, for example, of over 60%, between 10% and 60% approximately, and of over 3% up to 11% approximately of the incident light falling upon the rear view mirror and coming from the rear view of the road, etc.

It is the primary object of this invention to provide new and novel means for mounting and adjusting such a prismatic rear view mirror to bring any one of three images of varying degrees of light intensity of the common rear field of view into the normal predetermined line of forward vision of the driver.

Another object of this invention is to provide means for adjusting such a rear view mirror which involves a minimum of effort on the part of the driver, both as to physical exertion and diversion of attention from the view ahead.

Another object of this invention is to provide means whereby the rear view mirror may be selectively moved through three given points on a predetermined arc and means to insure positive positioning at these points against any vibrational movement or accidental jarring tending to displace said mirror from a previously set point.

A further object of this invention is the provision of means enabling angular adjustment of the rear view mirror by finger-tip control to any one of the three given positions without disturbing the basic rear view image to the extent of removing it from the driver's normal forward line of vision.

A further object of this invention is the provision of means for facilitating easy angular adjustment of the mirror through the two given points most commonly used to control light intensity coupled with locking means to prevent accidental movement of the mirror to the third position which is used only under intensive glare conditions.

A still further object of this invention is the provision of means for locking the mirror in position for normal light intensity while it is being bodily adjusted to establish the basic image within the normal forward line of vision of the driver.

Other objects and advantages of the invention will become more apparent during the course of the following description when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical sectional view taken substantially on line 2—2 of Fig. 1, showing the mirror in position for normal night driving conditions;

Fig. 3 is a fragmentary, vertical sectional view taken substantially on line 3—3 of Fig. 2;

Fig. 4 is a horizontal sectional view of the mirror adjusting means taken substantially on line 4—4 of Fig. 3;

Fig. 5 is a vertical sectional view taken substantially on line 2—2 of Fig. 1, showing the mirror in position for normal daytime driving conditions;

Fig. 6 is a vertical sectional view taken substantially on line 2—2 of Fig. 1, showing the mirror in position for driving under conditions involving extreme glare; and Fig. 7 is a detail section taken substantially on line 7—7 of Fig. 3.

With reference now to the drawings, there is disclosed a mirror element 10 comprising a support body $a$ of glass or other transparent material which is wedge-shaped in vertical cross section and is provided with front and rear reflecting surfaces $b$ and $c$, respectively, in the form of coatings arranged one behind the other, and with their upper edges in converging relationship and the lower edges more widely spaced apart. Thus, the mirror reflective means or coatings may be arranged upon a prism which may be of glass or plastic and disposed in non-parallel relationship or upon sheets of the same arranged in prism form.

The angle between the two mirror reflective coatings $b$ and $c$ which form a front mirror and a rear mirror, is preferably of the order of three and one-fourth degrees, although, there may readily be used an angular separation between the two mirrors of from two to ten degrees or more, the larger angular separation of close to ten degrees being preferable when a prism composed of glass sheets is used.

By way of example, the back surface of the support body $a$ may carry a highly reflective mirror film $c$ which, as a coating on a plane sheet of glass, would have a reflectivity preferably ranging from 50% to 95% or more and which is preferably opaque. On the other hand, the front surface of the support body may carry a reflective film means $b$ which is preferably semi-transparent, of substantially no light absorption, and has a reflectivity of 10% to 30% for use in normal night driving and in daytime driving under snow and sun glare conditions.

According to the invention, the mirror element 10 is carried by a substantially rectangular case 11 having a back wall 12, top wall 13, bottom wall 14 and opposite end walls 15. The case is open at the front and has a forwardly directed peripheral flange 16 which overlaps the edges of the mirror element 10 and serves to hold it rigidly in position to close the front of the case. As will be seen in Fig. 2, the flange 16 includes a substantially vertical wall portion 17 which engages the rear surface of the mirror element to hold it against rearward displacement, and a bent forward edge portion 18 which engages corresponding beveled edge portions of the mirror element to hold it against forward displacement.

The case 11 is rigidly supported by a backing plate 19 which is suitably secured by rivets 20 or the like to the back wall 12 of said case intermediate its ends. The backing plate 19 is hingedly carried by a vertical support plate 21, disposed in front of and spaced from said backing plate, by means of downwardly bent tabs 22 provided at opposite ends of the forwardly directed upper edge 23 of said backing plate. These tabs 22 are arranged to overlay corresponding tabs 24 bent upwardly at opposite ends of the forwardly directed upper edge 25 of said support plate. The tabs 22 and 24 have aligned openings therein through which is passed a horizontal pin 26 by which the backing plate 19 is hingedly attached to the support plate 21 thereby permitting said backing plate, together with the case and mirror, to be tilted or rotated as a unit relative to said stationary support plate to selectively position the mirror to reflect the desired image intensity.

The stationary support plate 21 is carried by means of a truncated ball 27, provided at the outer end of a preferably cylindrical shaft 28 which terminates at its inner end, in a threaded portion, or the like (not shown), by which means said shaft is rigidly attached to the vehicle.

The ball 27 extends through an opening 29 in the back wall 12 of case 11; then through a complementary opening 30 in the backing plate 19 and is secured in a formed seat or bearing 31 in the support plate 21, said ball being retained in the seat 31 by a metal strap 32 having a centrally formed bearing surface 33 which bears against said ball. The opposite ends of the strap 32 are secured to the support plate 21 by rivets 34 or the like.

In use, the support plate 21 and strap 32 coact to grip the ball 27 with sufficient pressure to maintain said support plate stationary except when it is desired to adjust the mirror assembly bodily as a unit with respect to said ball to position said mirror assembly for different drivers.

Formed integral with and depending from the backing plate 19, is a forwardly off-set leg 35, having its vertical axis substantially parallel to the vertical axis of said backing plate. The depending leg 35 terminates adjacent the bottom wall 14 of the case 11 in a forwardly directed portion 36 and an upwardly directed portion 37, which is disposed in spaced substantially parallel relation with the leg 35 to provide therebetween a well or trough-shaped housing 37a. Mounted within the well 37a is a substantially horizontal lever 38 pivoted intermediate its ends upon a pin 39 which passes through aligned holes in the leg 35, vertical portion 37, and lever 38.

The lever 38 is provided at one end thereof with a cam block 40 and at its other end with a downwardly projecting leg 41 which passes through an opening 42 in the bottom wall 14 of the case and terminates in a horizontal finger engaging portion 43. The cam block 40 is normally continuously urged upwardly into engagement with the lower end of the support plate 21 by means of a spring 44 located beneath said cam block, said spring yieldably holding the cam block against the support plate 21 in a selectively predetermined position.

The upper cam surface of the cam block 40 has three points of contact with the support plate 21 for selectively locating the mirror element 10 in any one of the three positions shown in Figs. 2, 5 and 6 upon tilting of the case with respect to said support plate. Thus, the upper cam surface of cam block 40 comprises a substantially convex portion $d$ extending between points $e$ and $f$, rising, in a substantially vertical plane to the right of point $f$ to form a wall $g$ and then sloping downwardly as at $h$ to point $i$. The three points of contact with support plate referred to above are points $e$, $f$ and $i$.

For instance, when driving under normal daytime conditions, the mirror element 10 will be disposed in the position shown in Fig. 5, at which time the lower edge of the support plate 21 will engage the cam 40 at point $e$. On the other hand, using the mirror for normal night driving, it will be placed in the position shown in Fig. 2, at which time the lower edge of the support plate 21 engages the cam at point $f$, and when the driving conditions are such that the rear view involves extreme glare, the mirror is tilted to the position shown in Fig. 6, at which time the lower edge of the support plate 21 engages the cam at point $i$.

It will be seen that the convex portion $d$ of the cam surface between points $e$ and $f$ facilitates selective adjustment of the mirror between these points by merely grasping the case and tilting it in the direction required, depending upon whether the mirror is to be used for normal day or night driving. However, when it is desired that the mirror be adjusted to the position for extreme glare (Fig. 6), it is simply necessary for the driver to press upwardly on the finger piece 43, thereby depressing the cam block 40 which enables the support plate to pass over the vertical wall $g$ and then along surface $h$ to point $i$ as shown in Fig. 6. The purpose of the vertical wall $g$ is to prevent accidental shifting of the mirror during normal day or night driving to the position shown in Fig. 6 where the light intensity is not commonly sufficient for the normal driver.

From the above, it will be seen that the cam surface is so formed that the driver may freely rotate the mirror from the position shown in Fig. 6 to either of the positions indicated in Fig. 2 or Fig. 5 by merely grasping the case and rotating it in a clockwise direction and that it is not necessary to use the finger piece 43. Likewise, the mirror can be freely moved between the positions shown in Fig. 2 and Fig. 5 without making use of the finger piece 43; thus, it is ncessary for the operator to actuate finger piece 43 only when he wants to position the mirror for abnormal night driving as in Fig. 6.

In using the invention as above described, it is, of course, necessary that the mirror first be bodily adjusted to suit the particular driver. Briefly, this is accomplished by locking the pivoted lever 38 and stationary support plate 21 together so that upon adjustment of the case by the driver, the said support plate will be similarly adjusted upon the supporting ball 27. For this purpose, there is provided on the lever 38 at the end thereof opposite the cam 40, a longitudinal slot 45, said slot being parallel to the longitudinal axis of the lever and displaced forwardly from the rear edge thereof. When it is desired to lock the lever 38 to the support plate 21, the case 11 is first grasped by the operator's hand and moved into the position shown in Fig. 5 where the cam 40 engages the support plate 21 at cam point $e$. The finger piece 43 is then urged upwardly to rotate the lever 38 about its pivot 39 thereby causing the slot 45 in said lever to be displaced upwardly to receive within said slot the depending portion 46 of the support plate 21. When this is done, the support plate will be clamped between the lever 38 and the depending leg 35 (Fig. 7) whereupon the desired bodily adjustment of the mirror about the support ball 27 can be readily effected by the driver. Releasing the finger piece 43 places the mirror in the position (Fig. 5), commonly used for normal daytime driving.

It is to be understood that the form of the invention herewith shown and described is to be taken as the preferred embodiment of the same, and that various changes in the shape, size, and arrangement of parts may be resorted to without departing from the spirit of the invention or the scope of the subjoined claims.

We claim:

1. In a rear view mirror for automotive vehicles, a case having an opening at the front thereof, a mirror element permanently secured in and closing said opening, plate means permanently secured to said case, a stationary substantially vertical support plate within said case, means for hingedly attaching said plate means to said support plate, means carried by the support plate for attachment to a vehicle, means pivotally mounted within the case having a cam surface engageable by the lower end of said support plate and over which said plate rides upon rotation of the case to locate the mirror element in desired position, and means on said pivotally mounted means and engaging said support plate for locking the case thereto to enable bodily adjustment of the mirror.

2. In a rear view mirror for automotive vehicles, a case having an opening at the front thereof, a mirror element secured in and closing said opening, plate means secured to said case, a stationary support plate within said case, means for hingedly attaching said plate means to said support plate, means carried by the support plate for attachment to a vehicle, a pivotally mounted cam also within said case yieldably coacting with said support plate to selectively locate said case and mirror element in any one of three positions relative to said support plate when the case is rotated, said cam having a cam surface thereon engageable by and over which the lower end of the support plate rides upon rotation of the mirror relative to said support plate, said cam surface including a convex portion over which the support plate rides freely when the mirror is moved to either one of two positions; a second cam portion over which the support plate rides upon movement of the mirror to a third position; and a substantially vertical wall portion for normally limiting movement of the mirror to said third position upon engagement of the support plate therewith, and lever actuating means carrying said cam and by means of which the said cam can be moved out of engagement with the support plate to enable movement of the latter past the said vertical wall portion and the said mirror to said third position.

3. In a rear view mirror for automotive vehicles, a case having a back wall and provided with an opening at the front thereof, a mirror element secured in and closing said opening, a rigid plate means secured to said case, a substantially stationary support plate disposed within said case, means for hingedly attaching said plate means to said support plate, means carried by the support plate for attachment to a vehicle, means for locating the case and mirror element with respect to the support plate upon tilting of said case, said locating means including a pivoted lever within the case having a cam portion at one end thereof engageable with said support plate and a slot at the other end thereof, said lever being adapted to engage said support plate substantially along the area defined by said slot to restrict movement of said pivoted lever relative to the support plate when in engagement therewith, and actuator means attached to the pivoted lever and extending exteriorly of the case.

4. A rear view mirror for automobiles providing a selection of at least two different intensities of the rear road, comprising a substantially stationary support plate, a case surrounding said support plate, said case having a back wall and being open at the front thereof, a mirror element carried by said case and permanently closing the front thereof, means for pivotally attaching said case to said support plate, means carried by said support plate for attachment to an automobile, said support plate being movably engageable with said last named means within said case to enable said support plate and said case to be adjusted bodily with respect to said automobile, and a pivotally mounted cam carried by the case and engageable with said support plate for locating the mirror element at different angular locations relative to said support plate to position the mirror surface in predetermined selected positions to reflect to the same point images of different intensities when said case is pivoted with respect to said support plate.

5. A rear view mirror device for automobiles as claimed in claim 4, in which means are provided on said pivotally mounted cam for restricting movement of said case and mirror element toward at least one of the angular locations relative to said support plate.

References Cited in the file of this patent

UNITED STATES PATENTS

| | | |
|---|---|---|
| 2,420,259 | McNamara | May 6, 1947 |
| 2,588,792 | Barkley | Mar. 11, 1952 |
| 2,669,159 | Rogers | Feb. 16, 1954 |